United States Patent [19]
Shaw et al.

[11] 3,764,018
[45] Oct. 9, 1973

[54] FLUID TRANSFER MEMBRANE USE THEREOF AND METHOD OF MANUFACTURE THEREFOR

[75] Inventors: Richard Gregg Shaw, Califon; Joseph Sylvan Byck, Kendall Park, both of N.J.

[73] Assignee: Union Carbide Corporation, New York, N.Y.

[22] Filed: June 15, 1971

[21] Appl. No.: 153,337

[52] U.S. Cl. ............................................. 210/500
[51] Int. Cl. ............................................ B01d 31/00
[58] Field of Search ................... 210/500; 23/258.5; 55/16, 158

[56] References Cited
UNITED STATES PATENTS
3,303,254  2/1967  Simons........................... 210/500 X
2,972,349  2/1961  Dewall............................. 23/258.5
3,615,024  10/1971  Michaels......................... 210/500 X
3,299,157  1/1967  Bappour et al. ................ 210/500 X

*Primary Examiner*—Frank A. Spear, Jr.
*Attorney*—Paul A. Rose, Aldo J. Cozzi, Gerald R. O'Brien, Jr. and Bernard Francis Crowe

[57] ABSTRACT

A fluid transfer membrane comprising a thin-walled permeable polymeric film having a plurality of first orifices circumscribed by the inner surfaces of oblong shaped portions of said film and by outer surfaces of connecting portions joining said oblong shaped portions and having a plurality of second orifices circumscribed by the outer surface of said oblong shaped portions and by the inner surfaces of connecting portions of said film joining said oblong shaped portions at both ends thereof. This fluid transfer membrane is useful in chemical, biomedical and pharmaceutical fluid transfer operations.

4 Claims, 2 Drawing Figures

PATENTED OCT 9 1973 3,764,018

INVENTORS
RICHARD G. SHAW
JOSEPH S. BYCK
BY Marvin Feldman
ATTORNEY

FLUID TRANSFER MEMBRANE USE THEREOF AND METHOD OF MANUFACTURE THEREFOR

This invention relates to a permeable membrane having two pluralities of film-separated orifices capable of gas or solute transfer therebetween. Specifically this invention relates to a thin-walled permeable membrane whereby a gas or solute containing fluid flowing through a plurality of first orifices transfers the gas or solute through the film of the membrane to a second fluid flowing through a plurality of second orifices.

This invention also relates to a method for manufacturing the fluid transfer membrane. Specifically, this invention also relates to a method for providing a thin-walled permeable polymeric film forming membrane having a plurality of film-separated orifices.

This invention also relates to the use of said membrane in the treatment of blood.

The term "permeable" as used hereinbefore and hereinafter throughout the specification and claims refers to gaseous or solute permeability depending upon the respective fluid media flowing in the first and second orifices.

The term "oblong shaped" as used hereinbefore and hereinafter throughout the specification and claims refers to a geometric configuration having the shape of or approximating the shape of an elongated development of a single-sided or multi-sided configuration.

The term "thin-walled" as used hereinbefore and hereinafter throughout the specification and claims refers to a polymeric wall thickness of from about 1 to about 100 microns. Preferably the polymeric wall thickness is from about 1 to about 50 microns. Most preferably the polymeric wall is from about 5 to about 20 microns. Of course the desired wall thickness is related to the permeability of the fluid-to-polymer and the designed structural integrity of the membrane.

Various chemical, pharmaceutical and biomedical processes require permeable membranes for gaseous or solute exchange between fluids flowing on separate surfaces of the membrane.

To ensure a desirably high rate of transfer the gas permeable membrane must be thin so as to reduce membrane resistance. The desirably thin membrane must also be structurally secure to prevent rupture of the membrane during operation. Additionally and most desirably the ratio of effective gas transfer area per unit pressure drop across the membrane should large to provide high degrees of transfer within limited operating spaces.

The prior art in an attempt to solve the aforementioned problems sought to use hollow permeable fibers whereby a first fluid would flow through the hollow of the fiber and a second fluid would flow around the outer surface of the hollow fiber; there being gaseous or solute exchange through the fiber wall. One of the major drawbacks inherent in this design is the limitation of the type of polymeric film to one which could be readily fiber-drawn and hollowed.

To date no system has provided a single thin-walled polymeric film having a plurality of film separated flow orifices, the first flow orifices defined by one surface of the film and the second flow orifices defined by the other surface of the film wherein the film is gas or solute permeable. The selection of polymeric film in the present invention is not so limited as in the aforementioned prior art design insofar as the plymeric composition of this invention need not be one readily fiber-drawn.

As stated, the invention described herein is a membrane comprising a thin-walled permeable polymeric film having a plurality of two film-separated flow orifices, the first orifices defined by one surface of the film and the second orifices defined by the other surface of the film.

More specifically the membrane of this invention comprises a thin-walled permeable polymeric film having a plurality of first orifices circumscribed by the inner surfaces of oblong shaped portions and by the outer surfaces of connecting portions of said film joining the oblong shaped portions and having a plurality of second orifices circumscribed by the outer surface of said oblong shaped portions and by the inner surfaces of connecting portions of said film joining said oblong shaped portions at both ends thereof.

As a depiction of a preferred embodiment of the apparatus there is provided the following figures.

Figure 1:
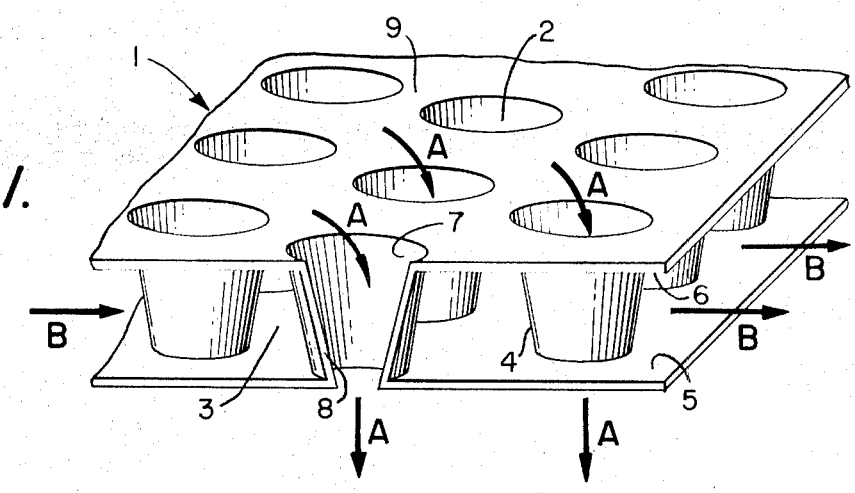
FIG. 1 is a greatly enlarged fragmentary sectional oblique view of the membrane of this invention.

Referring specifically to FIG. 1, there is shown the membrane of a polymeric film 1 wherein the heavily shaded arrows represent a typical flow pattern for two fluids A and B, said fluids being separated by the film 1.

Again referring specifically to FIG. 1, there is shown a polymeric film 1 having a plurality of first orifices 2 (typical) said first orifices circumscribed by the inner surface 7 of oblong shaped portions (viz. frustum of a cone) 8 of said film 1 and by the outer surfaces of connecting portions 9 (typical) joining said cylindrically shaped portions 8 and having a plurality of second orifices 3 (typical) circumscribed by the outer surface 4 of said cylindrically shaped portions 8 and by the inner surfaces 5 and 6 of connecting portions 9 of said film 1 joining said oblong shaped positions 8 at both ends thereof.

Figure 2:
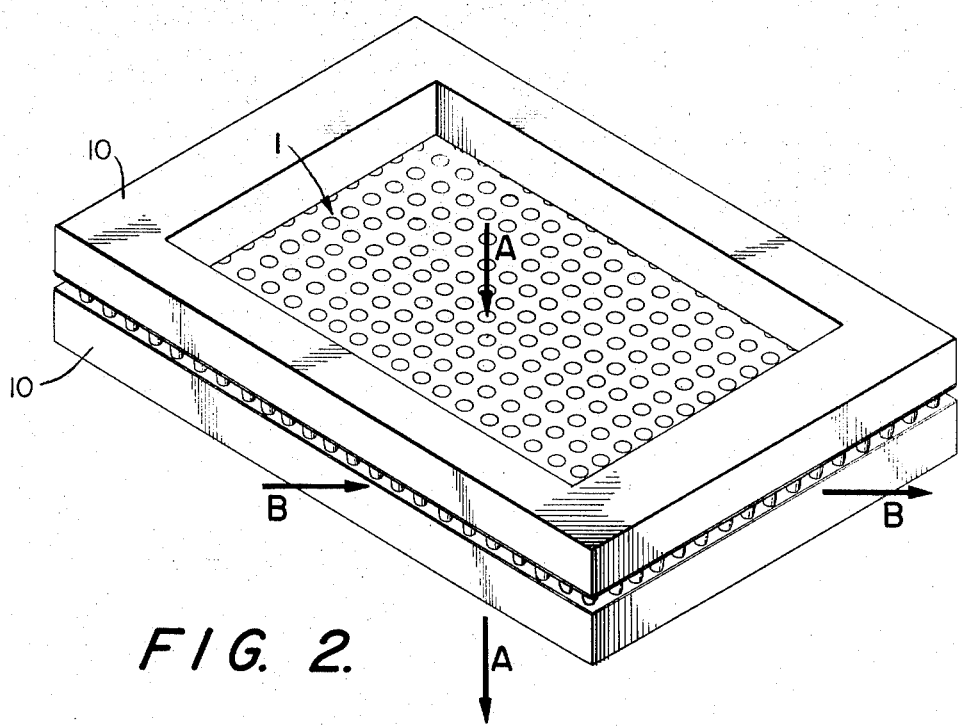
FIG. 2 is an isometric view of an assembled membrane unit; the orifices shown disproportionately enlarged.

Referring to FIG. 2 there is shown the membrane held between retaining members 10 to demonstrate a typical single membrane unit. FIG. 2 depicts the mode in which the retaining members 10 ensure separation of the fluid streams A and B. This typical membrane unit may be stacked in multiple units to provide any desired degree of fluid transfer. The membrane units may be arranged for series or parallel flow or combinations thereof as desired.

For any given application, the number of oblong shaped flow orifices per square inch of membrane is generally from about 2,500 to about 90,000 in number, but may be more or less if desired.

At times it may be desirable to limit the number and location of the oblong shaped orifices to provide a designed degree of structural integrity.

As stated the membrane of this invention is broadly useful in chemical, biomedical and pharmaceutical fluid transfer operations. A specific example of such application is in the removal of toxic metabolites from blood and oxygenation of the blood, such as is the case in an artifical kidney or artifical lung operation. The membrane may be used for the exchange of oxygen and carbon dioxide in a blood stream so as to remove the waste gaseous carbon dioxide and subsequently introduce oxygen into the bloodstream.

The membrane of this invention is peculiarly suited for gaseous transfer in a blood stream, specifically the red corpuscles therein. In a gaseous transfer in blood during an operation, it is believed necessary that the residence time of a red blood cell in a fluid transfer membrane be minimized. By "minimization" it is meant that minimal period required to effect a gaseous transfer. To achieve this residence time minimization, it is necessary to have a membrane wherein the blood flow orifices are small in diameter to ensure gaseous transfer in a one-pass operation while being large enough to permit flow without an excessive pressure drop across the membrane.

It was known that the diameter of a red blood cell was about 8 to 9 microns. And it was determined that oblong shaped orifices of the membrane of this invention having diameters of from 10 microns to about 100 microns with a oblong depth of from about 20 to about 150 microns achieved the desired minimum residence time for red blood cells, in a one-pass operation.

In oxygenation, blood flows through the oblong shaped orifices while oxygen flows through the other orifices of the membrane of this invention.

To remove carbon dioxide from the blood, the blood flows through the oblong shaped orifices while a carbon dioxide solution medium, such as an inert gas, flows through the other orifices of the membrane of this invention.

The need for a reliable thin-walled membrane with a large transfer area per unit pressure drop across the membrane is thus self-evident.

Another example of the usefulness of this invention is in the removal of noxious gases or solutes from polluted waters. Large volumes of polluted water would be passed through a plurality of membranes with minimal loss of head. The noxious gases or solutes would pass through the film to the other orifices.

Referring to FIGS. 1 and 2 it is noted that normally the A fluid will be a liquid while the B fluid will be a gas. This is simply because the unit pressure drop for the A fluid is generally less than that for the B fluid. However A and B may be any two fluids subject to gas or solute transfer therebetween.

Many design modifications may be made to the membrane without deviation from the scope or intent of this invention.

The membrane of this invention may be of any permeable polymeric film.

Suitable permeable polymeric film materials include thermoplastic homopolymers and copolymers. For example the olefin polymers such as low density polyethylene and the like.

Also included within this term are the olefin copolymers formed by the copolymerization of an olefin monomer and one or more copolymerizable monomers. Monomers which provide copolymers of outstanding characteristics are the vinyl type copolymers.

Illustrative of monomers and mixtures thereof which can be homopolymerized or copolymerized with an olefin monomer to form thermoplastic polymeric materials which can be utilized in accordance with the present invention are the following: vinyl aryls such a styrene, o-methoxystyrene, p-methoxystyrene, m-methoxystyrene, o-nitrostyrene, m-nitrostyrene, o-methylstyrene, p-methylstyrene, m-methylstyrene, p-phenyl-stryrene, o-phenylstyrene, m-phenylstyrene, vinylnaphthalene and the like; vinyl and vinylidene halides such as vinyl chloride, vinylidene chloride, vinylidene bromide and the like; vinyl esters such as vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; alkyl esters of maleic and fumaric acid such as dimethyl maleate, diethyl maleate and the like; vinyl alkyl esters and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidine, ethyl methylene malonate and the like.

Preferred copolymers are styrene and the ethylene copolymers such as ethylene/ethyl acrylate, ethylene/vinyl acetate, ethylene/vinyl chloride, ethylene/acrylic acid, and the like.

Also included within the term olefin polymers are the blends of olefin polymers with other polymers. Illustrative of such blends are polyethylene with polypropylene, low density polyethylene with high density polyethylene, polyethylene with olefin copolymers such as those indicated above, for example, ethylene/acrylic acid copolymer, ethylene/methyl acrylate copolymer, ethylene/ethylacrylate copolymer, ethylene/vinyl acetate copolymer, ethylene/acrylic acid/ethyl acrylate terpolymer, ethylene/acrylic acid/vinyl acetate terpolymer, and the like.

Other suitable materials include polyvinyl alcohol; ethylene oxide graft copolymers; cellulose esters; para-xylene polymers, reconstituted collagen, silicone polymers and copolymers, and like materials.

The preferred permeable polymeric film materials are para-xylene polymers and polyethylene.

The thickness of the polymeric film is generally from about 1 micron to about 100 microns. Preferred film thickness generally is from about 1 micron to about 50 microns. However, the film may be of any desireable thickness depending upon the particular application, as previously stated.

The oblong shaped orifice may be of any desired diameter or diameters generally in the range of from 1 micron to 100 microns. For most applications the range is from about 10 microns to about 50 microns depending upon the particular application.

As stated, the term "oblong shaped" refers to a geometric configuration having the shape of or approximating the shape of any oblongated development of any single-sided or multi-sided configuration. For example the oblong shape may be a cylinder, a frustum of a cone, a frustum of a pyramid, or a frustum of any multi-sided oblongated surface and the like. Generally the oblong shape will be cylindrically shaped or in a more specific case the frustum of a cone, but may be of any desired orifice configuration.

The method of manufacture for the membrane of this invention comprises the sequential steps of:

a. coating a removable plate with a photoresistive chemical;

b. placing a mask selected from template, positive transparency or negative transparency, having a plurality of opaque or translucent regions, over said photoresistive coating;

c. exposing the mask to a radiant energy source;

d. removing the mask;

e. developing the photoresistive material to provide unprotective portions coincident with said regions;

f. removing plate material to form a template having a plurality of oblong shaped orifices coincident with the regions;

g. coating the template surfaces, with a permeable polymeric film composition;

h. exposing at least one end surface of the template; and i. removing the template material; so that the remaining polymeric film defines the membrane.

Suitable removable plate materials include any material that is capable of being etched, dissolved, melted, washed-out, vaporized, physically reduced to small particles or by any means whereby a normally solid plate is physically and/or chemically structurally altered to a removable form.

For example the removable plate may be a metal capable of being etched.

Suitable etchable plate materials are aluminum, brass, copper, ferrous metals, zinc metals, and the like and alloys thereof.

Suitable etchants include inorganic acids, inorganic acid salt solutions, aqua regia and the like.

As stated the plate material may be any material capable of being removed by physical and/or chemical means without attacking the polymeric film material.

For example the plate material may be a low molecular weight soluble polymer and may be dissolved out (such as in the case of polyethylene glycol). Or the plate material may be a low melting polymer vis a vis the film material and may be preferentially melted out.

Also the plate material may be a low melting alloy or eutectic alloy such as Wood's metal in which case the plate may be melted-out.

Also the plate may be composed of salts and minerals in which case the plate may be washed out or dissolved out.

The plate material may be a wax such as the paraffin waxes or beeswax in which case the wax may be selectively melted out.

Additionally the plate may be a glass subjected to breakage and/or hydrofluoric etching for removal thereof.

The mask may be a transparency or a template. In the case of the transparency there will be a plurality of opaque regions or dots defining the location and shape of the oblong shaped orifices of the membrane orifices. In the case of the template having a plurality of orifices, the orifices define the location and shape of the oblong shaped orifices of the membrane.

The photoresistive material may be positive or negative acting, in one case the mask will be a template or positive transparency, while in the other case the mask will be a negative transparency. In any event those regions of the removable plate coincident with the dots or orifices will be removed so as to form a template.

The radiant energy source may be any suitable light source such as a carbon arc or incadenscent or fluorescent light source.

The process step of coating the template with the polymeric material may be accomplished by any suitable coating operation such as dipping, electrodepositing, vapor-depositing, flowing, spraying, wiping, solution coating, emulsion coating, suspension coating, dispersion coating, powder coating and like methods.

In addition there are several other methods for forming porous membranes such as asymmetrical membranes. For example by first swelling a thermoplastic polymer with a swelling agent and then coagulating the swollen film with a de-swelling agent which is miscible with the swelling agent but immiscible with the polymer and thereafter drying the film, there is formed a foraminous permeable film. Other known membrane film forming techniques are also within the contemplation of this invention.

The following is an example of the method of manufacture for the fluid transfer membrane of this invention.

EXAMPLE

A 2 mil brass shim stock was coated with Kodak KPR (a trade name of the Kodak Co. Rochester, New York) photoresist. The coated shim stock was covered with a Type A By-Chrome 150 dots per inch screen tint mask, which mask served as a negative. The masked and coated shim stock was placed in a vacuum frame and exposed to a carbon arc. The mask was then removed. The photoresistive coated brass shim stock was placed in a developing medium for the Kodak KPR photoresistive rendering the light struck areas insoluble.

The shim stock was then removed by etching in an ammonium persulfate bath thereby removing that material coincident with the dots so as to form a template having a plurality of cylindrically shaped holes.

The template was then dip coated by vapor depositions with polyparaxylylene. After coating the shim stock was cut at the edges to expose the brass metal. The brass metal shim was then removed by etching in an ammonium persulfate solution which solution did not attack the polyparaxylylene. The resultant film defined a fluid transfer membrane.

The above example was repeated with the polyparaxylylene being vapor deposited in lieu of dip coating. The resultant membrane was again achieved.

What is claimed is:

1. A fluid transfer membrane comprising a permeable polymeric film having a wall thickness of from about 1 micron to about 100 microns and a plurality of first orifices, said first orifices circumscribed by the inner surfaces of oblong shaped portions of said film and by the outer surfaces of connecting portions of said film joining said oblong shaped portions and having a plurality of second orifices circumscribed by the outer surfaces of said oblong shaped portions and by the inner surfaces of connecting portions of said film joining said oblong shaped portions at both ends thereof.

2. A method for the manufacture of a fluid transfer membrane comprising a thin walled permeable polymeric film having a plurality of first orifices circumscribed by the inner surfaces of oblong shaped portions of said film and by the outer surfaces of connecting portions joining said oblong shaped portions and having a plurality of second orifices circumscribed by the outer surfaces of said oblong shaped portions and by the inner surfaces of connecting portions of said film joining said oblong portions at both ends thereof, which method comprises the sequential steps of:
  a. coating a removable plate with a photoresistive chemical;
  b. placing a mask selected from a template, a positive transparency or a negative transparency, with a plurality of opaque or translucent regions over said photoresistive coating;
  c. exposing the mask to a radiant energy source;
  d. removing the mask;
  e. developing the photoresistive material to provide unprotective portions of said plate coincident with said regions;
  f. removing plate material to form a template having a plurality of oblong shaped orifices coincident with said regions;
  g. coating the template surfaces with a permeable polymeric film composition;
  h. exposing at least one end surface of the template; and
  i. removing the template material; so that the remaining polymeric film defines said membrane.

3. A method for the manufacture of a fluid transfer membrane comprising a thin-walled gas permeable polymer film having a plurality of first orifices circumscribed by the inner surfaces of oblong shaped portions of said film and by the outer surfaces of connecting portions joining said oblong shaped portions and having a plurality of second orifices circumscribed by the outer surface of said oblong shaped portions and by the inner surfaces of connecting portions of said film joining said oblong portions at both ends thereof, which method comprises the sequential steps of:
  a. coating an etchable plate with a photo-resistive chemical;
  b. placing a negative with a plurality of opaque regions over said photoresistive coating;
  c. exposing the negative to a radiant energy source;
  d. removing the negative;
  e. developing the photoresistive material to provide unprotective regions coincident with said opaque regions;
  f. etching the plate with an inorganic acid to form a template having a plurality of oblong shaped orifices coincident with the opaque regions;
  g. coating the template surfaces, circumscribed by the inner surface of the oblong shaped orifices and by the outer surface of the joining portions, with a permeable thermoplastic polymeric film composition;
  h. cutting the coated template to expose the end surfaces of the template; and
  i. etching the template with an inorganic acid to remove the template material; so that the remaining polymeric film defines said membrane.

4. A method for the manufacture of a fluid transfer membrane comprising a thin walled gas permeable polymer film having a plurality of first orifices circumscribed by the inner surfaces of cylindrically shaped portions of said film and by the outer surfaces of connecting portions joining said cylindrically shaped portion and having a plurality of second orifices circumscribed by the outer surface of said cylindrically shaped portions and by the inner surfaces of connecting portions of said film joining said cylindrical portions at both ends thereof, which method comprises the sequential steps of:
  a. coating an etchable plate with a photo-resistive chemical;
  b. placing a negative with a plurality of dots over said photoresistive coating;
  c. exposing the negative to a radiant energy source;
  d. removing the negative;
  e. developing the photoresistive material to provide unprotective regions coincident with said dots;
  f. etching the plate to form a template having a plurality of cylindrically shaped orifices coincident with the dots;
  g. coating the template surfaces, circumscribed by the inner surface of the cylindrically shaped orifices and by the outer surface of the joining portions, with a gas permeable polymeric film composition;
  h. exposing the end surfaces of the template; and
  i. etching the template to remove the template material; so that the remaining polymeric film defines said membrane.

* * * * *